(12) United States Patent
Barranco et al.

(10) Patent No.: US 11,335,064 B1
(45) Date of Patent: May 17, 2022

(54) SYSTEM AND PROCESSES FOR DETERMINING SUITABILITY OF MANUFACTURING PROCESSES FROM A DIGITAL 3D MODEL OF A PRODUCT TO BE MANUFACTURED

(71) Applicants: Ronald Joseph Barranco, Reno, NV (US); Beau Jesse Robertson, Aptos, CA (US)

(72) Inventors: Ronald Joseph Barranco, Reno, NV (US); Beau Jesse Robertson, Aptos, CA (US)

(73) Assignee: ZCastings Inc., Verdi, NV (US)

( * ) Notice: Subject to any disclaimer, the term of this patent is extended or adjusted under 35 U.S.C. 154(b) by 257 days.

(21) Appl. No.: 16/530,733

(22) Filed: Aug. 2, 2019

Related U.S. Application Data

(60) Provisional application No. 62/680,998, filed on Jun. 5, 2018.

(51) Int. Cl.
  *G06T 17/30* (2006.01)
  *G06T 19/20* (2011.01)
  *G06T 17/20* (2006.01)
  *G06F 30/00* (2020.01)

(52) U.S. Cl.
  CPC .............. *G06T 17/30* (2013.01); *G06F 30/00* (2020.01); *G06T 17/20* (2013.01); *G06T 19/20* (2013.01)

(58) Field of Classification Search
  CPC ......... G06T 17/30; G06T 17/20; G06T 19/20; G06F 30/00
  USPC .............................................. 703/1
  See application file for complete search history.

(56) References Cited

U.S. PATENT DOCUMENTS

| | | | |
|---|---|---|---|
| 2008/0040080 A1* | 2/2008 | Bae ..................... | G06F 30/00 703/1 |
| 2015/0231808 A1* | 8/2015 | Konchan .............. | B29C 45/7312 425/552 |

OTHER PUBLICATIONS

Banerjee_2007 (Geometrical Algorithms for Automated Design of Side Actions iin Injection Moulding of Complex Parts, Science Direct Computer-Aided Design 39 (2007) 882-897 (Year: 2007).*

(Continued)

*Primary Examiner* — Brian S Cook
(74) *Attorney, Agent, or Firm* — Plager Schack LLP; Mark H. Plager; Stephen Hallberg

(57) ABSTRACT

A system and processes are disclosed for determining suitability of multiple manufacturing processes from a digital 3D model of a product to be manufactured. The processes receive, analyze, and store data for analysis of 3D model with respect to several manufacturing options, and then identify suitability of each manufacturing process according to several aspects of the 3D model, thereby intelligently providing visual and mathematical answers to the users.

6 Claims, 6 Drawing Sheets

(56) References Cited

OTHER PUBLICATIONS

Archer_1988 (Early Cost Estimation of Injection Molded Components Univerity of Rhode Island, 1988) (Year: 1988).*
Jong_2017 (Automatic Recognition and Construction of Draft Angle for Injection Mold Design, Journal of Software Engineering and Application, 2017) (Year: 2017).*
LANXESS_2007 (LANXESS Energizing Chemistry Engineering Plastics Part and Mold Design, A Design Guide, 2007) (Year: 2007).*
Sarmiento_Merida_2016 (Determining the optimum parting direction in plastic injection molds based on Minimizing rough machining time during mold manufacturing, Advances in Polymer Technology, vol. 37 2016). (Year: 2016).*
STIL_2017 (archived copy dated May 27, 2017 downloaded from httpw://www.3dsystems.com/quickparts/learning-center/what-is-stl-file) (Year: 2017).*

* cited by examiner

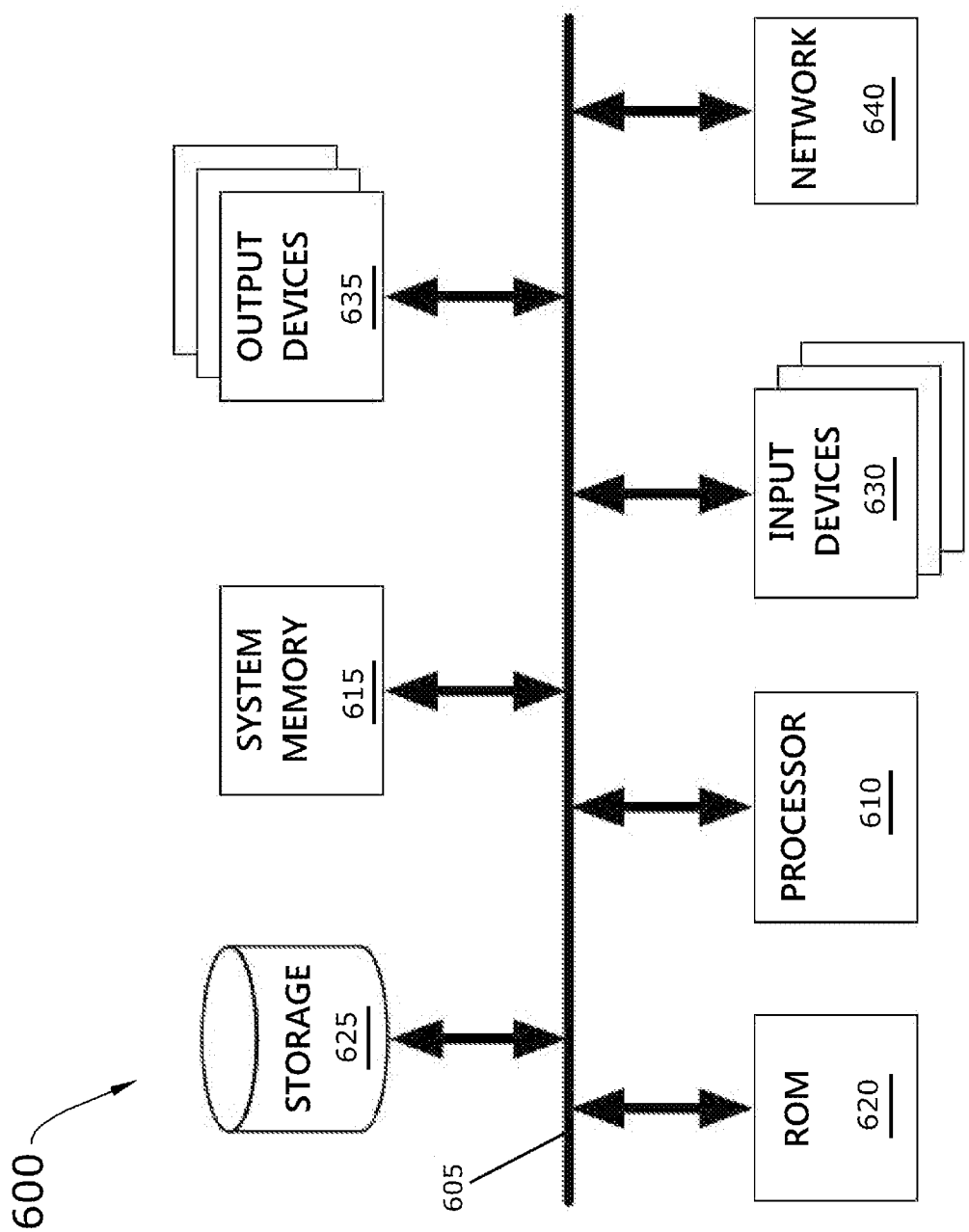

US 11,335,064 B1

SYSTEM AND PROCESSES FOR DETERMINING SUITABILITY OF MANUFACTURING PROCESSES FROM A DIGITAL 3D MODEL OF A PRODUCT TO BE MANUFACTURED

CLAIM OF BENEFIT TO PRIOR APPLICATION

This application claims benefit to U.S. Provisional Patent Application 62/680,998, entitled "SYSTEM AND PROCESS FOR DETERMINING SUITABILITY OF MANUFACTURING PROCESSES FROM A DIGITAL 3D MODEL OF A PRODUCT TO BE MANUFACTURED," filed Jun. 5, 2018. The U.S. Provisional Patent Application 62/680,998 is incorporated herein by reference.

BACKGROUND

Embodiments of the invention described in this specification relate generally to evaluating properties of digital 3D models, and more particularly, to a system and processes for determining suitability of manufacturing processes from a digital 3D model of a product to be manufactured.

3D files which include 3D models of items to be manufactured are typically used prior to manufacturing. Such 3D files include data about the associated 3D models. Typically, the data is used in relation to one chosen manufacturing process. However, there are several manufacturing processes available for consideration, and the existing conventional systems simply do not consider the object data for the 3D model in relation to all manufacturing options. For instance, the existing online viewing and analyzing software options do not give answers or recommendations in relation to manufacturability of an item in relation to the numerous manufacturing options available. This is problematic for those who choose a manufacturing process that is less suitable than another.

Therefore, what is needed is a way to consider several different manufacturing processes in relation to a single item to be manufactured, by considering the relevant object data about the item to be manufactured based on a 3D model in a 3D file for the item.

BRIEF DESCRIPTION

A novel system and processes are disclosed for determining suitability of manufacturing processes from a digital 3D model of a product to be manufactured. In some embodiments, the processes receive, analyze, and store data for analysis of 3D model with respect to several manufacturing options, generate manufacturing data based on surface data of the 3D model, and then identify suitability of each manufacturing process according to several aspects of the 3D model, thereby intelligently providing visual and mathematical answers to the users as well as usable results for manufacturing. The processes for determining suitability of manufacturing processes from a digital 3D model of a product to be manufactured include (i) a line matrix 3D surface data analysis process for generating data to use in determining suitability of manufacturing processes for an item to be manufactured and (ii) a rasterized 3D surface data analysis process for generating data to use in determining suitability of manufacturing processes for an item to be manufactured.

In some embodiments, the system comprises a cloud-based manufacturing process suitability system that provides a software-as-a-service (SaaS) 3D surface data analysis service for determining suitability of manufacturing processes from a digital 3D model of a product to be manufactured by a known manufacturing process.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
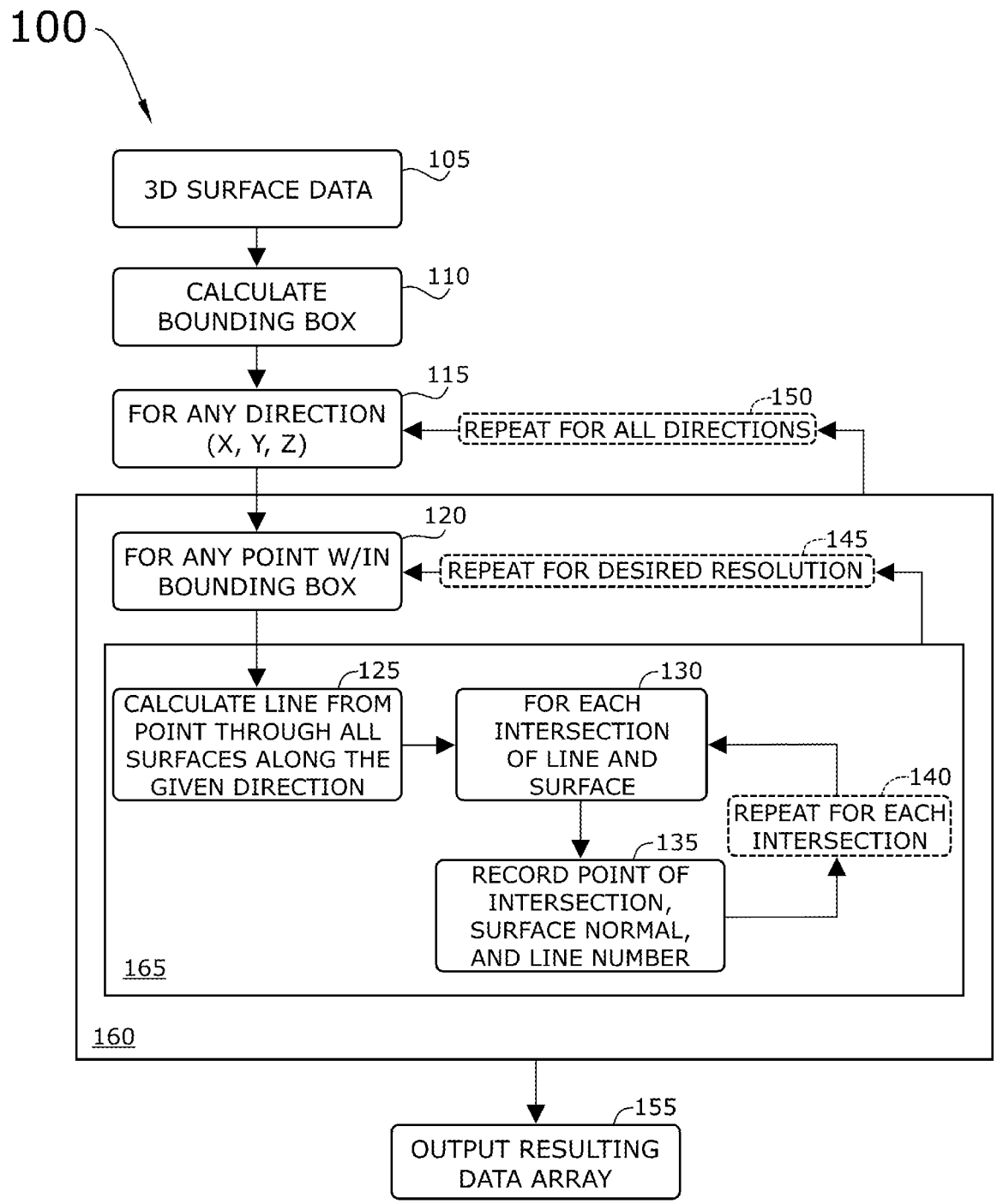

Having thus described the invention in general terms, reference is now made to the accompanying drawings, which are not necessarily drawn to scale, and which show different views of different example embodiments, and wherein:

FIG. 1 conceptually illustrates a block diagram of line matrix 3D surface data analysis as performed by a system that determines suitability of manufacturing processes for an item to be manufactured in some embodiments.

Figure 2:
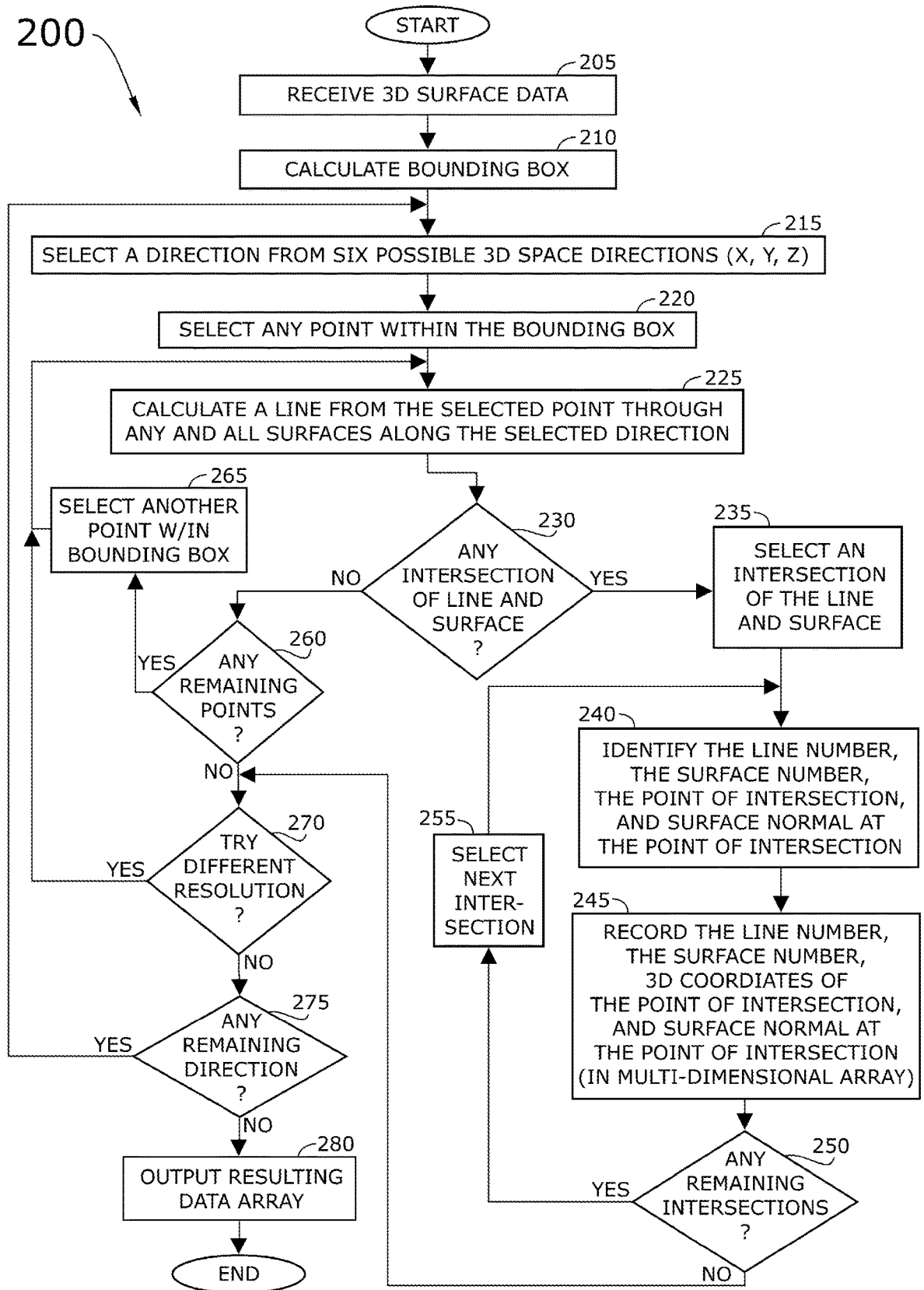

FIG. 2 conceptually illustrates a line matrix 3D surface data analysis process for generating data to use in determining suitability of manufacturing processes for an item to be manufactured in some embodiments.

Figure 3:
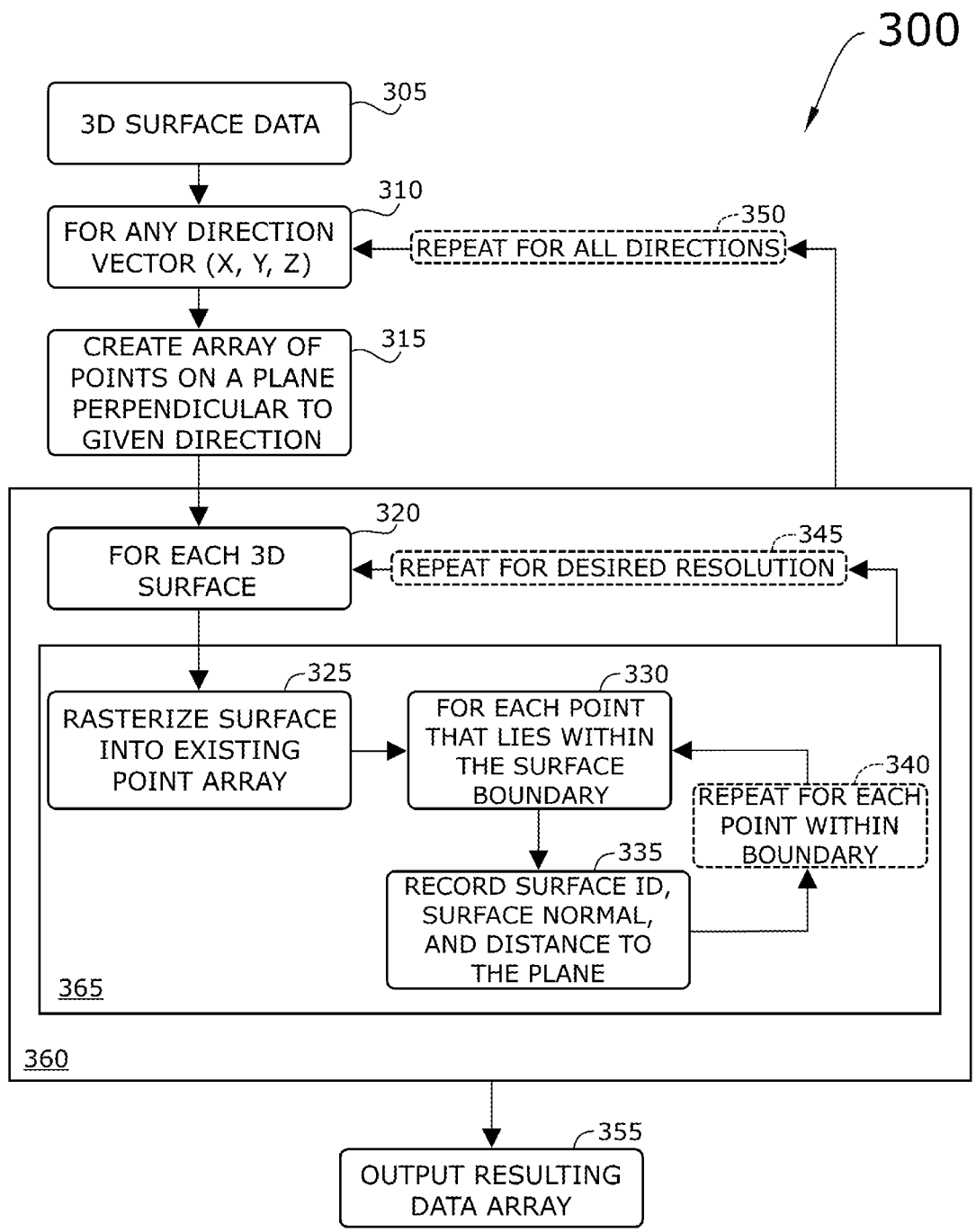

FIG. 3 conceptually illustrates a block diagram of rasterized 3D surface data analysis as performed by a system that determines suitability of manufacturing processes for an item to be manufactured in some embodiments.

Figure 4:
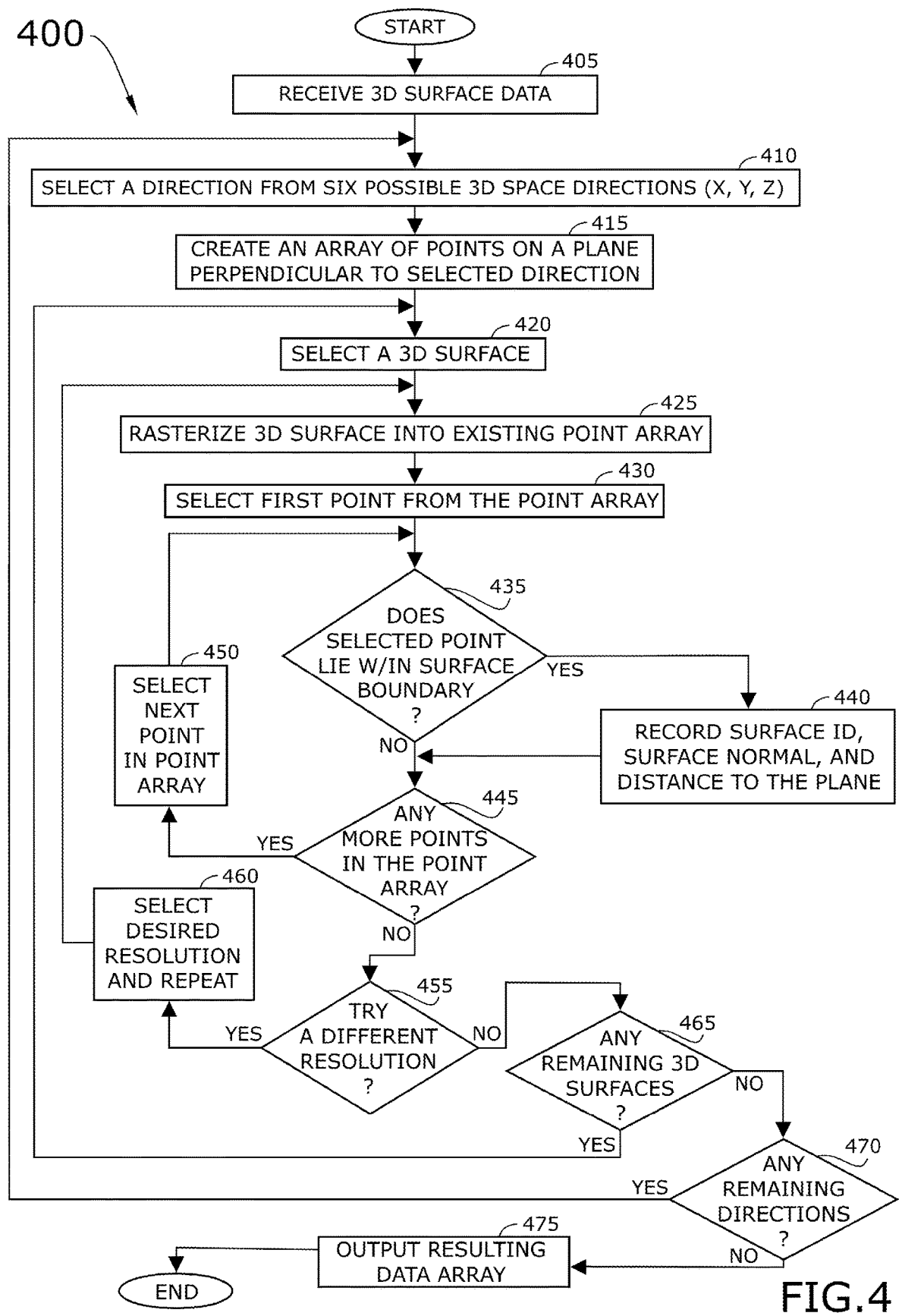

FIG. 4 conceptually illustrates a rasterized 3D surface data analysis process for generating data to use in determining suitability of manufacturing processes for an item to be manufactured in some embodiments.

Figure 5:
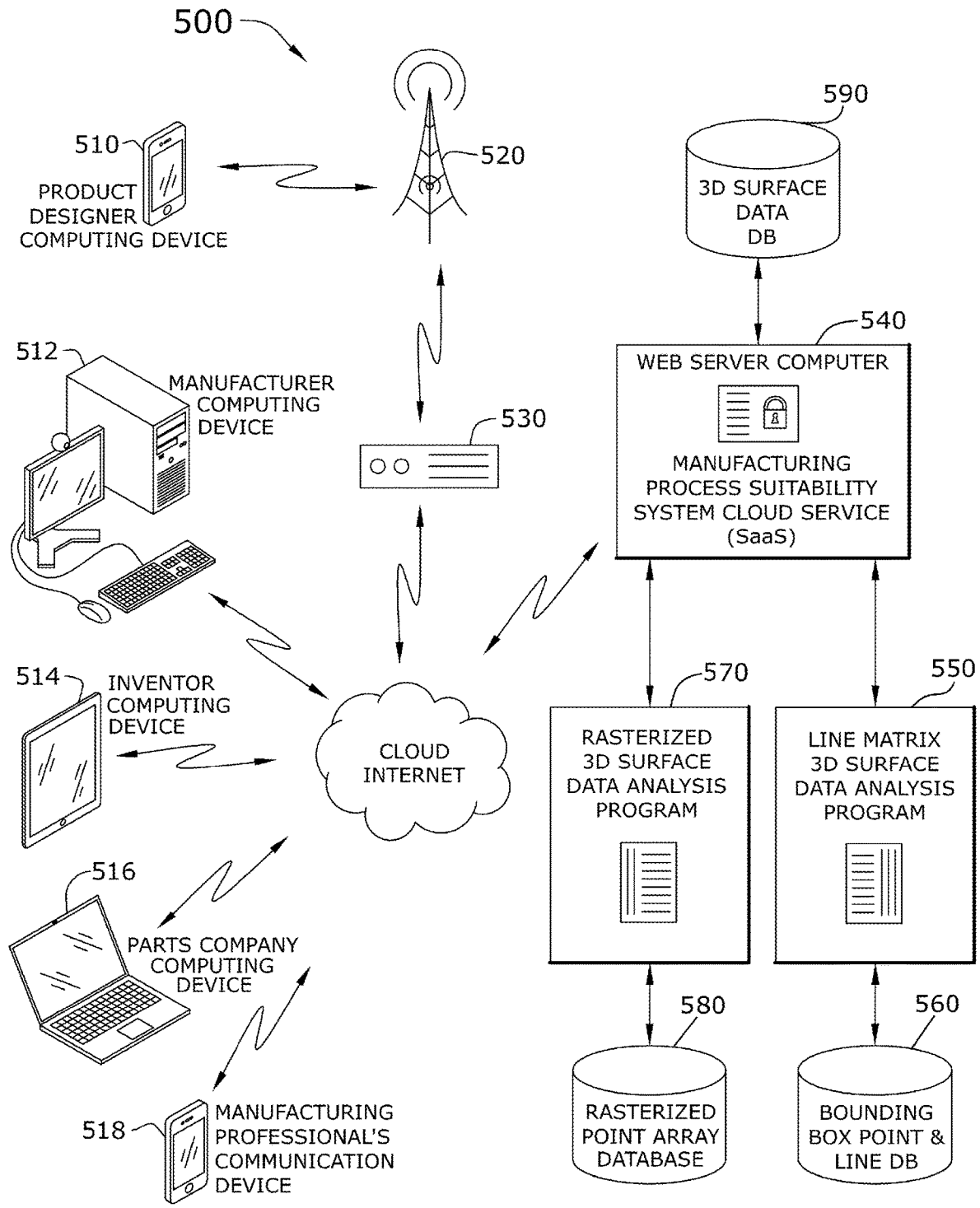

FIG. 5 conceptually illustrates a network architecture of a cloud-based manufacturing process suitability system in some embodiments that provides a software-as-a-service (SaaS) 3D surface data analysis service for determining suitability of manufacturing processes from a digital 3D model of a product to be manufactured by a known manufacturing process.

FIG. 6 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel system and processes for determining suitability of manufacturing processes from a digital 3D model of a product to be manufactured. In some embodiments, the processes for determining suitability of manufacturing processes from a digital 3D model receive, analyze, and store data for analysis of 3D model with respect to several manufacturing options, generate manufacturing data based on surface data of the 3D model, and then identify suitability of each manufacturing process according to several aspects of the 3D model, thereby intelligently providing visual and mathematical answers to the users as well as usable results for manufacturing. The processes for determining suitability of manufacturing processes from a digital 3D model of a product to be manufactured include (i) a line matrix 3D surface data analysis process for generating data to use in determining suitability of manufacturing processes for an item to be manufactured and (ii) a rasterized 3D surface data analysis process for generating data to use in determining suitability of manufacturing processes for an item to be manufactured.

In some embodiments, the system comprises a cloud-based manufacturing process suitability system that provides a software-as-a-service (SaaS) 3D surface data analysis service for determining suitability of manufacturing processes from a digital 3D model of a product to be manufactured by a known manufacturing process.

As stated above, 3D files include data about the associated 3D models. Typically, the data is used in relation to one chosen manufacturing process. However, there are several manufacturing processes available for consideration, and the existing conventional systems simply do not consider the object data for the 3D model in relation to all manufacturing options. Embodiments of the system and processes for determining suitability of manufacturing processes from a digital 3D model described in this specification solve such problems by analyzing the 3D models in 3D files, generating manufacturing data based on surface data of the 3D models, and providing usable results for manufacturing and insights into the manufacturability of the item(s) to be manufactured according to each of the manufacturing processes.

Embodiments of the system and processes for determining suitability of manufacturing processes from a digital 3D model described in this specification differ from and improve upon currently existing options. In particular, the existing conventional online 3D software options to view models do not analyze data as to provide certain answers this invention does provide. In addition, some embodiments improve upon the currently existing options because other possible systems do not use actual intelligence based on true mechanical data. In contrast, the system and processes for determining suitability of manufacturing processes from a digital 3D model of the present disclosure receives, analyzes, and stores data for many analysis, and then intelligently gives visual and mathematical answers to the users.

The system and processes for determining suitability of manufacturing processes from a digital 3D model of the present disclosure may be comprised of the following elements. This list of possible constituent elements is intended to be exemplary only and it is not intended that this list be used to limit the system and processes for determining suitability of manufacturing processes from a digital 3D model of the present application to just these elements. Persons having ordinary skill in the art relevant to the present disclosure may understand there to be equivalent elements that may be substituted within the present disclosure without changing the essential function or operation of the system and processes for determining suitability of manufacturing processes from a digital 3D model.

1. Determine which of six directions any point on each surface can be "made". This is done by calculating the angle between the surface normal at the point and each of the six direction vectors. A direction will qualify if the calculated angle meets a predetermined criteria. The predetermined criteria for an angle varies for any particular manufacturing process that the 3D surface data is being used to qualify. Therefore, the data set merely stores the calculated angle between the selected direction vector and the surface normal of the surface or point being analyzed. In some cases, the predetermined criteria can be explicitly set by a user, or can be configured as default predetermined criteria. As an example, the calculated angle could be used to qualify a surface/point or group of surfaces/points with regards to a metal die casting process in which the requirement could be that the angle between the surface normal and the selected direction must be 87 degrees or less. If the angle is 80 degrees (or any radial amount less than or equal to 87 degrees), then the surface/point meets the criteria. However, if the angle is 87.5 degrees (or any radial amount greater than 87 degrees) it does not satisfy the criteria.

2. Organize surfaces or points into groups based on proximity to each other and their "make" directions. Surfaces that share an edge or vertex are neighboring or in proximity to each other. Points which lie on the same surface or on neighboring surfaces are in proximity to each other. Surfaces or points which are in proximity and share the same make direction can be grouped together.

3. Determine if any group is "trapped". A group is said to be trapped if a line drawn along the make direction vector from any point on any surface within the group to respective maximum dimension of the entire model bound box is shown to intersect another surface, edge, or point.

4. Determine group boundaries (referred as to "parting lines"). For a group of surfaces, the boundary edges are any surface edges that are not shared by another surface in the same group. For a group of points, boundary points are those that have only three or fewer neighbors.

The various elements of the system and process for determining suitability of manufacturing processes from a digital 3D model of the present disclosure may be related in the following exemplary fashion. It is not intended to limit the scope or nature of the relationships between the various elements and the following examples are presented as illustrative examples only.

The system and processes for determining suitability of manufacturing processes from a digital 3D model of the present disclosure generally works once files are uploaded to a remote cloud storage (e.g., a cloud server of the system that is communicably connected to one or more cloud database (s), such as the cloud-based manufacturing process suitability system described in detail below by reference to FIG. 5). Then the files are analyzed in such a way as to be used to determine manufacturing of unlimited mechanical molding processes. In some embodiments, the processes will predetermine which manufacturing processes are the most suitable for the specific designs (e.g., based on the 3D models that visualize those designs) being analyzed. The resulting data set can be used to (i) determine whether a 3D part file is suitable for a particular manufacturing process, (ii) determine the size, surface area, and trapped volume of each group of surfaces, (iii) flag issues preventing the part from qualifying for a particular process, and (iv) determine tooling and part cost for multiple manufacturing processes.

Specifically, the resulting data set can be used to (i) determine whether a 3D part file is suitable for a particular manufacturing process because the data set will represent multiple groups of surfaces, each of which can be formed by a single tooling action commonly found in many manufacturing and fabrication processes. By comparing the data set to any particular manufacturing process's requirements regarding part surface geometry, number of groups, a group's physical size and surface data, a part design can then be qualified or disqualified for that particular manufacturing process.

Additionally, the resulting data set can be used to (ii) determine the size, surface area, and trapped volume of each group of surfaces by summing the total maximum and minimum dimensions of each group in each of three axis (X, Y, Z), summing the total surface area and summing the total of trapped surfaces within the group.

Furthermore, the resulting data set can be used to (iii) flag issues preventing the part from qualifying for a particular process. For instance, if a particular group or multiple groups do not meet the requirements of a particular manufacturing process, that particular group or those multiple groups can be highlighted and feedback can be provided to the user identifying the issue.

Finally, the resulting data set can be used to (iv) determine tooling and part cost for multiple manufacturing processes. For instance, the number of groups can be used to determine the number of tooling pieces within a mold or a form. Furthermore, the physical size, the volume, and the total surface area of each group can be used to determine the necessary size, the volume, and the surface area of each individual tooling or form part. This information can then be used along with a costing algorithm or program to determine cost.

To make the system and processes for determining suitability of manufacturing processes from a digital 3D model of the present disclosure, one may code software that implements each of the processes for determining suitability of manufacturing processes from a digital 3D model and are able to be integrated with a 3D model software (or which is the 3D software itself). Further examples of computer program implementations of the processes for determining suitability of manufacturing processes from a digital 3D model are described below by reference to FIGS. 1-4. Specifically, a line matrix 3D surface data analysis computer program implementation is described below by reference to FIGS. 1 and 2, and a rasterized 3D surface data analysis computer program implementation is described below by reference to FIGS. 3 and 4. Also, similar functions as those provided by the processes for determining suitability of manufacturing processes from a digital 3D model could be achieved by implementing the processes in and producing completed applets, mobile apps, and/or plugins (collectively referred to as "app" or "apps" for each of the processes for determining suitability of manufacturing processes from a digital 3D model) where once the data have been analyzed in the apps the data can then be stored on the cloud, run on a computing device (such as the web server computer or a cloud server with processing unit), communications device, or any electronic device that provides data communication and connectivity over a wide public network, such as the Internet, for session-based connections to an SaaS 3D surface data analysis service for determining suitability of manufacturing processes from a digital 3D model of a product to be manufactured by a known manufacturing process.

To use the system and processes for determining suitability of manufacturing processes from a digital 3D model of the present disclosure, a person may register as a user of the system, sign in, and securely upload 3D design files to the website (web server) which hosts the SaaS 3D surface data analysis service for determining suitability of manufacturing processes from a digital 3D model of a product to be manufactured by a known manufacturing process and provides functionality of the computer program implementations of the processes. After analysis the user would see visually and with information ready at hand to help them determine whether the design is acceptable for various manufacturing types. The SaaS 3D surface data analysis service for determining suitability of manufacturing processes from a digital 3D model of a product to be manufactured by a known manufacturing process would automatically try to qualify certain manufacturing processes and offer possible changes to qualify other manufacturing processes that may be unknown or know to the users.

Several more detailed embodiments are described by reference to Figures in the sections below. Section I pertains to line matrix 3D surface data analysis as described by reference to FIGS. 1 and 2. Section II pertains to rasterized 3D surface data analysis as described by reference to FIGS. 3 and 4. Section III describes a network architecture of a cloud-based manufacturing process suitability system that determines suitability of manufacturing processes from a digital 3D model of a product to be manufactured by a known manufacturing process as described by reference to FIG. 5. Section IV describes an electronic system by reference to FIG. 6 which implements one or more embodiments of the invention.

I. Line Matrix 3D Surface Data Analysis

In some embodiments, a line matrix 3D surface data analysis computer program is developed to process 3D surface data which is intended to represent a physical, three dimensional part or object that is intended to be manufactured by way of a known manufacturing process, such as casting, molding, etc. The line matrix 3D surface data analysis computer program establishes a matrix of 3D line segments which intersect the 3D surface geometry. For each line segment, each intersection between the line and any surface is calculated and stored in a multi-dimensional array. For each line segment, a number of intersection points may be calculated and indexed into the multi-dimensional array. For each intersection point, the line matrix 3D surface data analysis computer program stores the index of the associated line segment ("line number"), the 3D coordinates (Cartesian coordinates, X, Y, Z) of the intersection point, the index of the surface ("surface number" or "surface ID") through which the lines intersects, and the surface normal at the point of intersection. The line matrix 3D surface data analysis computer program outputs the resulting data in the multi-dimensional array. The resulting data can be used to determine a variety of information regarding the manufacturability of the part or object with regards to the known manufacturing process by which the part or object is intended to be manufactured.

For instance, the surface normal at any given intersection point can be used to determine whether a draft angle of that surface is acceptable with regards to the vector direction of the line segment and the known manufacturing process (e.g., casting, molding, etc.) intended to be employed to manufacture the part or object. The line matrix 3D surface data analysis computer program compares results from multiple directions to determine the direction with the least unacceptable surfaces.

For undercut or trapped surfaces, when a given line segment is associated with more than two intersection points, the part or object to be manufactured is considered to have an undercut surface or a trapped volume with regards to a traditional casting process when oriented in the direction of the line segment vector. Given that the intersection points are ordered from one side of the part or object to the other side of the part or object along the given line segment, the first and last points can be shown to lie on "outer surfaces"

and all internal points are understood as lying on "trapped surfaces". Furthermore, intersection points can be grouped to be re-analyzed with regards to a different direction. For instance, all points indicating undercut or trapped surface can be pulled from the initial data array and re-analyzed as if they are separate parts or objects to determine whether they can be manufactured from a different direction than the external surfaces.

By way of example, FIG. 1 conceptually illustrates a block diagram of line matrix 3D surface data analysis 100 as performed by a system that determines suitability of manufacturing processes for an item to be manufactured in some embodiments. As shown in this figure, the line matrix 3D surface data analysis 100 includes 3D surface data 105. In some embodiments, the 3D surface data 105 is obtained from a digital 3D model of an object to be manufactured. In some embodiments, the 3D surface data 105 includes 3D surface geometry data for the 3D model.

In some embodiments, the line matrix 3D surface data analysis 100 uses the 3D surface data to calculate a bounding box 110. In this specification, a bounding box is calculated to provide spatial measurements of the extents of the part or object. In some embodiments, the bounding box 110 is calculated as a minimal bounding box. For example, it is useful to calculate a minimal bounding box in cases where the part or object intended to be manufactured can be oriented in multiple different ways, and different bounding box calculations are possible for the different orientations.

The bounding box is calculated to for standard Cartensian three-dimensional space in which there is an X-axis, a Y-axis, and a Z-axis. From any given point, it is possible to project a vector in any of six directions that correspond to both directions along the X-axis, both directions along the Y-axis, and both directions of the Z-axis.

In some embodiments, the line matrix 3D surface data analysis 100 performs a plurality of operations and analysis for any direction (X, Y, Z) 115 and for any point within the bounding box 120. In some embodiments, the plurality of operations and analysis for the point within the bounding box and for the given direction is repeated for a desired resolution 145, as shown by enclosed inner rectangle 165. In some embodiments, the plurality of operations and analysis for the point within the bounding box (at all repeated resolutions) is repeated for all six directions 150, as shown by enclosed outer rectangle 160.

In some embodiments, the plurality of operations and analysis performed as part of the line matrix 3D surface data analysis 100, as shown within the enclosed inner rectangle 165, includes calculating a line 125 from the given point within the bounding box 120 through all surfaces all the given direction 115. In some embodiments, the plurality of operations and analysis performed as part of the line matrix 3D surface data analysis 100 further includes, for each intersection of the line and a surface 130, recording data about the intersection 135 including the point of intersection, surface normal at the point of intersection, and the line number. In some embodiments, recording data about the intersection 135 is repeated for each intersection 140 of the line and a surface.

In some embodiments, the line matrix 3D surface data analysis 100 results in the multi-dimensional array being stored with a lot of data. Thus, the line matrix 3D surface data analysis 100 outputs the resulting data array 155.

Turning to another example of line matrix 3D surface data analysis, FIG. 2 conceptually illustrates a line matrix 3D surface data analysis process 200 for generating data to use in determining suitability of manufacturing processes for an item to be manufactured. In some embodiments, steps of the line matrix 3D surface data analysis process 200 are performed by the line matrix 3D surface data analysis computer program.

In some embodiments, the line matrix 3D surface data analysis process 200 receives (at 205) the 3D surface data. The 3D surface data is the surface geometry information associated with the 3D model of the part or object intended to be manufactured according to a known manufacturing process, such as metal casting, molding, etc. In some embodiments, the line matrix 3D surface data analysis process 200 then calculates (at 210) a bounding box to provide a measure of the extents of the part or object.

After calculating the bounding box, the line matrix 3D surface data analysis process 200 of some embodiments selects (at 215) a direction from six possible 3D space directions (according to Cartesian space, X-axis, Y-axis, and Z-axis). In some embodiments, the line matrix 3D surface data analysis process 200 then selects (at 220) any point within the bounding box. Now with the point selected, the line matrix 3D surface data analysis process 200 calculates (at 225) a line from the selected point through any and all surfaces along the selected direction and within the bounding box. The calculated line is, therefore, a projection of the point along the given direction and may intersect with one or more surfaces of the part or object.

In some embodiments, the line matrix 3D surface data analysis process 200 determines (at 230) whether there are any intersections between the projected line and any surface. When there are no intersections of a surface from the projected line, the line matrix 3D surface data analysis process 200 of some embodiments determines (at 260) whether to continue the line matrix 3D surface data analysis in relation to other remaining points or not. Details of the steps for determining (at 260) and subsequent steps are described further below.

On the other hand, when one or more intersections are determined (at 230) to be present from the line projection and one or more surfaces, then the line matrix 3D surface data analysis process 200 selects (at 235) an intersection of the line and a surface. In some embodiments, the line matrix 3D surface data analysis process 200 then identifies (at 240) the line number, the surface number, the point of intersection, and surface normal at the point of intersection. In some embodiments, the line matrix 3D surface data analysis process 200 then records in the multi-dimensional array (at 245) the line number, the surface number, 3D coordinates (X, Y, Z) at the point of intersection, and surface normal at the point of intersection.

After recording the data for the intersection, the line matrix 3D surface data analysis process 200 of some embodiments determines (at 250) whether there are any remaining intersections of other surfaces from the projection of the line along the selected direction. When there is at least one more intersection, the line matrix 3D surface data analysis process 200 of some embodiments selects (at 255) the next intersection and proceeds to identify and record the line-surface intersection data in the multi-dimensional array. On the other hand, when there are no more intersections, then the line matrix 3D surface data analysis process 200 continues ahead to a step for determining (at 270) whether to try a different resolution or not, which is described in greater detail below.

Turning back to the determination (at 230) of whether there is any intersection of the line and a surface, when there is no intersection of any surface from the line projection, then the line matrix 3D surface data analysis process 200 determines (at 260) whether there are remaining points to try as projected lines. When there are remaining points, the line matrix 3D surface data analysis process 200 selects (at 265) another point within the bounding box and returns to the step for calculating (at 225) a line from the selected point through any and all surfaces along the selected direction, and proceeds to the following steps as described above.

On the other hand, when there are no remaining points, the line matrix 3D surface data analysis process 200 of some embodiments determines (at 270) whether to try a different resolution. In some embodiments, a desired resolution is set for selecting points and calculating lines to see if there are any intersections. When there is a different resolution to try, such as the desired resolution, the line matrix 3D surface data analysis process 200 returns to the step for calculating (at 225) a line from the (same) selected point through any and all surfaces along the selected direction.

On the other hand, when there is no other resolution to try, the line matrix 3D surface data analysis process 200 of some embodiments determines (at 275) whether there are remaining directions to select from among the six directions (i.e., both directions of the X-axis, both directions of the Y-axis, and both directions of the Z-axis). Where there are remaining directions to select, the line matrix 3D surface data analysis process 200 returns to the step for selecting (at 215) another direction from the six possible 3D spatial directions. However, when there are no more directions to select (all directions have been selected and processing of point, line, surface, etc., is completed), the line matrix 3D surface data analysis process 200 of some embodiments outputs (at 280) the resulting data array. Then the line matrix 3D surface data analysis process 200 ends.

II. Rasterized 3D Surface Data Analysis

In some embodiments, a rasterized 3D surface data analysis computer program is developed to process 3D surface data which is intended to represent a physical, three dimensional part or object that is intended to be manufactured according to a known manufacturing process (e.g., casting, molding, etc.). The rasterized 3D surface data analysis computer program iterates through any data set or file representing 3D surface geometry. Each surface is rasterized into a 2D plane perpendicular to the direction of focus according to a predefined multi-dimensional point array. For each point that lies within the surface 2D boundary, the surface ID, the surface normal, and the distance to the plan may be calculated and indexed (stored or recorded) into the array. The resulting data array can then use to determine a variety of information regarding the suitability of using the intended manufacturing process to manufacture the part or object.

For instance, the surface normal at any given intersection point can be used to determine whether a draft angle of that surface is acceptable with regards to the vector direction of the line segment and the intended known manufacturing process (e.g., casting, molding, etc.) being considered to manufacture the part or object. The rasterized 3D surface data analysis computer program compares results from multiple directions to determine the direction with the least unacceptable surfaces.

When a given point within the point array for any given direction includes more than two surface identifiers, the part or object to be manufactured is considered to have an undercut surface or a trapped volume with regards to a traditional casting process when oriented in the direction of the line segment vector. Given that the distances are recorded and stored within the point array, the nearest and furthest points can be identified and shown to lie on "outer surfaces" and all internal points can be understood as lying on "trapped surfaces". Furthermore, intersection points can be grouped to be re-analyzed with respect to a different direction. For instance, all points indicating undercut or trapped surface can be pulled from the initial data array and re-analyzed as if they are a separate part to determine whether they can be manufactured from a different direction than the external surfaces.

By way of example, FIG. 3 conceptually illustrates a block diagram of rasterized 3D surface data analysis 300 as performed by a system that determines suitability of manufacturing processes for an item to be manufactured in some embodiments. As shown in this figure, the rasterized 3D surface data analysis 300 starts with 3D surface data 305 from a digital 3D model. The 3D surface data 305 includes 3D surface geometry data of the 3D model in relation to the part or the object intended to be manufactured.

In some embodiments, the rasterized 3D surface data analysis 300 identifies a direction vector 310 from any of six direction vectors (X, Y, Z). The rasterized 3D surface data analysis 300 repeats 350 everything that follows for all directions. Thus, the rasterized 3D surface data analysis 300 is repeated six times for the six different directions (i.e., both X-axis directions, both Y-axis directions, and both Z-axis directions).

In some embodiments, the rasterized 3D surface data analysis 300 creates an array of points ("point array") on a plane perpendicular to the given (present) direction 315. With the point array, the rasterized 3D surface data analysis 300 performs operations illustrated in an enclosed outer rectangle 360. The operations start by identifying a 3D surface 320, which is repeated 345 for each 3D surface. With the given 3D surface 320, the rasterized 3D surface data analysis 300 performs operations illustrated in an enclosed inner rectangle 365. The enclosed inner rectangle 365 operations start with rasterizing the 3D surface into the existing point array 325. Then, for each point that lies within the surface boundary 330, the rasterized 3D surface data analysis 300 records point data 335 including the surface ID, surface normal, and the distance to the plane. This is repeated 340 for each point within the surface boundary.

In some embodiments, the rasterized 3D surface data analysis 300 results in the point array data being output 355.

Turning to another example of rasterized 3D surface data analysis, FIG. 4 conceptually illustrates a rasterized 3D surface data analysis process 400 for generating data to use in determining suitability of manufacturing processes for an item to be manufactured. In some embodiments, steps of the rasterized 3D surface data analysis process 400 are performed by the rasterized 3D surface data analysis computer program.

In some embodiments, the rasterized 3D surface data analysis process 400 starts by receiving 3D surface data (at 405). Next, the rasterized 3D surface data analysis process 400 selects a direction (at 410) from the six possible directions (both directions along each of the X, Y, and Z axis).

After the 3D surface data is obtained and the direction is chosen, the rasterized 3D surface data analysis process 400 of some embodiments creates (at 415) an array of points ("point array") on a plane perpendicular to the selected direction. Next, the rasterized 3D surface data analysis process 400 selects (at 420) a 3D surface to use. The rasterized 3D surface data analysis computer program is configured to eventually select all of the 3D surfaces from the 3D surface data (of the part or object to be manufactured). The manner of selection can be in any organized manner, including order, total calculated area of the surface, extent of surface, etc.

With a 3D surface selected, the rasterized 3D surface data analysis process 400 of some embodiments rasterize (at 425) the selected 3D surface into the existing point array. Specifically, by rasterizing the 3D surface, a plurality of points of the surface are extracted, and represented or stored in the point array. In this way, the point array is populated with relevant 3D surface information for further processing.

In some embodiments, the rasterized 3D surface data analysis process 400 selects (at 430) a first point from the point array. In some embodiments, the rasterized 3D surface data analysis process 400 then determines (at 435) whether the selected point lies within the surface boundary of the 3D surface or not. When the selected point does not lie within the surface boundary, the rasterized 3D surface data analysis process 400 determines (at 445) whether there any remaining points in the point array which have not be analyzed.

On the other hand, when the selected point affirmatively lies within the surface boundary, the rasterized 3D surface data analysis process 400 records (at 440) the 3D surface ID, surface normal, and the distance to the plane, and then proceeds to the next step for determining (at 445) whether there any remaining points in the point array which have not be analyzed. When there is at least one remaining point in the point array which has not been analyzed, the rasterized 3D surface data analysis process 400 selects (at 450) the next point in the point array and returns to the step for determining (at 435) whether the selected point lies within the surface boundary of the 3D surface or not, as described above.

However, when the point array has no more points to be analyzed, then the rasterized 3D surface data analysis process 400 determines (at 455) whether to try a different resolution or not. When a different resolution, such as a desired resolution, is to be tried, the rasterized 3D surface data analysis process 400 then selects (at 460) the desired resolution and repeats the steps starting with rasterizing (at 425) the 3D surface into the point array, at the different, desired resolution, which can include many more or many fewer points, depending on the change in resolution.

On the other hand, when no other resolution change is needed, the rasterized 3D surface data analysis process 400 of some embodiments determines (at 465) whether there are any remaining 3D surfaces to analyze. When there are remaining 3D surfaces to analyze, the rasterized 3D surface data analysis process 400 returns to the step for selecting another 3D surface (at 420), and proceeds accordingly, as described above. However, when there are no remaining surfaces, the rasterized 3D surface data analysis process 400 then determines (at 470) whether there are any remaining directions to select from the six possible directions.

In some embodiments, when there is at least one direction not already selected among the six possible directions, the rasterized 3D surface data analysis process 400 returns to the step for selecting (at 410) another direction, and thereafter proceeds as described above. However, when there are no more directions to select from the six possible directions, then all the directions have been selected for analyzing rasterized 3D surface data. In some embodiments, the rasterized 3D surface data analysis process 400 then outputs (at 475) the resulting point array data. Then the rasterized 3D surface data analysis process 400 ends.

III. Cloud-Based Manufacturing Process Suitability System

By way of example, FIG. 5 conceptually illustrates a network architecture of a cloud-based manufacturing process suitability system 500 that provides a software-as-a-service (SaaS) 3D surface data analysis service for determining suitability of manufacturing processes from a digital 3D model of a product to be manufactured by a known manufacturing process.

As shown in this figure, the cloud-based manufacturing process suitability system 500 includes a product designer mobile device 510, a manufacturer computer 512, an inventor tablet computing device 514, a parts company laptop computer 516, and a manufacturing professional's mobile communications device 518. The cloud-based manufacturing process suitability system 500 also includes a wireless communication point 520 (e.g., a cell tower for cellular data communication), a gateway 530, a web server 540 that hosts a software-as-a-service (SaaS) 3D surface data analysis service for determining suitability of manufacturing processes from a digital 3D model of a product to be manufactured by a known manufacturing process (hereinafter "manufacturing process suitability system cloud service"), a line matrix 3D surface data analysis computer program 550, a bounding box point and line database 560, a rasterized 3D surface data analysis computer program 570, a rasterized point array database 580, and a 3D surface data client upload database 590. Users of the product designer mobile device 510, the manufacturer computer 512, the inventor tablet computing device 514, the parts company laptop computer 516, and/or the manufacturing professional's mobile communications device 518 connect to the web server 540 over the cloud (i.e., over the Internet) in order to access the manufacturing process suitability system cloud service to determine suitability of one or more specific manufacturing processes intended to be employed in the manufacture of a part or an object whose 3D surface data is uploaded to the web server 540 and stored in the 3D surface data client upload database 590 for use by the line matrix 3D surface data analysis program 550 and/or the rasterized 3D surface data analysis program. At runtime, the line matrix 3D surface data analysis computer program 550 calculates the bounding box, selects directions, selects points, projects and identifies lines (by number), identifies surfaces, detects intersections of line projections and surfaces, and identifies 3D spatial coordinates of points of intersections, all of which is handled as runtime data for use in determining the suitability of manufacturing the part or object via the intended manufacturing process. The calculated bounding box data, direction selection data, point data, calculated line projection information, line numbers, identified surface numbers, detected intersections, and point of intersection 3D coordinate data, as well as all other runtime data and other data calculated by the line matrix 3D surface data analysis computer program 550, is stored in the bounding box point and line database 560. Similarly, at runtime the rasterized 3D surface data analysis computer program 570 creates a point array on a plane that is perpendicular to the present selected direction and rasterized the 3D surface data into the point array for further processing. The rasterized point array database 580 is used at runtime to store the direction, the point array, the 3D surfaces, the rasterized data points and their respective array positions, and other such runtime data. After processing the 3D surface data for a given client connection (e.g., a connection from the product designer mobile device 510, the manufacturer computer 512, the inventor tablet computing device 514, the parts company laptop computer 516, and/or the manufacturing professional's mobile communications device 518), the line matrix 3D surface data analysis computer program 550 and/or the rasterized 3D surface data analysis computer program 570 outputs the resulting data array to the web server 540, which proceeds to transmit the resulting data array back to the device of the associated client connection.

IV. Electronic System

Many of the above-described features and applications are implemented as computer program or software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, solid state devices, EPROMs, etc. The computer readable media does not include carrier waves and electronic signals passing wirelessly or over wired connections.

In this specification, the terms "software", "computer program", or "program" are meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 6 conceptually illustrates an electronic system 600 with which some embodiments of the invention are implemented. The electronic system 600 may be a computer, phone, personal digital assistance device, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as cathode ray tubes (CRT) or liquid crystal displays (LCD). Some embodiments include a touchscreen that functions as both an input and output device.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 2 and 4 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a line matrix 3D surface data analysis program which, when executed by a processor of a computing device, determines suitability of multiple manufacturing processes from a digital 3D model of a product to be manufactured, said line matrix 3D surface data analysis program comprising sets of instructions for:

calculating a bounding box based on 3D surface data of a plurality of surfaces of a digital 3D model of an object, wherein the bounding box defines maximum dimensions of the digital 3D model;

selecting, for each surface in the plurality of surfaces, each direction among a plurality of possible directions to project a point on the surface of the digital 3D model;

calculating, for each surface in the plurality of surfaces, an angle between a surface normal at the point on the surface and each selected direction among the plurality of possible directions, wherein each calculated angle corresponds to a direction vector in a plurality of direction vectors that each project the point in the selected direction;

determining whether the calculated angle of each direction vector satisfies angle criteria requirements, wherein each direction vector in which the calculated angle satisfies angle criteria requirements is a make direction vector;

organizing surfaces and points into groups based on proximity to each other and their make direction vectors;

determining, for each organized group, whether the organized group is trapped, wherein the organized group is trapped when any line projection of the make direction vectors of any point on any surface within the organized group intersects at least one of a surface, an edge, and a point when the line projection is drawn to the maximum dimensions defined by the bounding box;

determining group boundaries comprising boundary edges and boundary points, wherein boundary edges are determined for each group of surfaces based on surface edges of each surface that are not shared with other surfaces, wherein boundary points are identified in the group as points that have no more than three neighbors; and providing a multi-dimensional array comprising a resulting set of data that allows the user to (i) determine whether the digital 3D model of the object is suitable for manufacture by each particular manufacturing process in a plurality of manufacturing processes, (ii) determine a size, a surface area, and a trapped volume of each organized group, (iii) flag issues preventing the object from qualifying for any particular manufacturing process in the plurality of manufacturing processes, and (iv) determine tooling and item cost for manufacturing the object by way of each particular manufacturing process in the plurality of manufacturing processes.

2. The non-transitory computer readable medium of claim 1, wherein the set of instructions for calculating the bounding box comprises a set of instructions for adjusting an orientation of the digital 3D model to calculate a minimal bounding box.

3. The non-transitory computer readable medium of claim 1, wherein the bounding box is calculated in standard three-dimensional Cartesian space comprising an X-axis, a Y-axis, and a Z-axis.

4. The non-transitory computer readable medium of claim 3, wherein the plurality of possible directions to project the point comprises six directions including two opposing X directions along the X-axis, two opposing Y directions along the Y-axis, and two opposing Z directions along the Z-axis.

5. The non-transitory computer readable medium of claim 1, wherein group boundaries represent parting lines for manufacture of the object by way of any manufacturing process in the plurality of manufacturing processes.

6. The non-transitory computer readable medium of claim 1, wherein the resulting set of data allows the user to compare part surface geometry, number of groups, and physical size and surface data of each group to part design requirements of any manufacturing process.

* * * * *